(12) United States Patent
Menezes et al.

(10) Patent No.: US 9,431,813 B2
(45) Date of Patent: Aug. 30, 2016

(54) REDUNDANT WIRED PIPE-IN-PIPE TELEMETRY SYSTEM

(71) Applicants: Clive D. Menezes, Houston, TX (US); Richard T. Hay, Spring, TX (US)

(72) Inventors: Clive D. Menezes, Houston, TX (US); Richard T. Hay, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 306 days.

(21) Appl. No.: 13/794,287

(22) Filed: Mar. 11, 2013

(65) Prior Publication Data

US 2014/0085099 A1    Mar. 27, 2014

Related U.S. Application Data

(63) Continuation-in-part of application No. PCT/US2012/056624, filed on Sep. 21, 2012.

(51) Int. Cl.
| | |
|---|---|
| *G01V 3/00* | (2006.01) |
| *E21B 47/00* | (2012.01) |
| *E21B 47/18* | (2012.01) |
| *E21B 47/14* | (2006.01) |
| *G01V 1/40* | (2006.01) |
| *H02G 9/06* | (2006.01) |
| *E21B 17/02* | (2006.01) |

(52) U.S. Cl.
CPC .............. *H02G 9/06* (2013.01); *E21B 17/028* (2013.01)

(58) Field of Classification Search
CPC ............. E21B 17/0028; E21B 17/003; E21B 17/203; E21B 47/12; G01V 11/002
USPC ........... 340/853.1–856.4; 73/152.01–152.62; 367/81–85
See application file for complete search history.

(56) References Cited

U.S. PATENT DOCUMENTS

| | | | |
|---|---|---|---|
| 4,445,734 A | 5/1984 | Cunningham | |
| 4,997,048 A * | 3/1991 | Isom .................... | E21B 17/003 166/57 |
| 6,913,093 B2 | 7/2005 | Hall et al. ........................ 175/57 |
| 7,002,445 B2 | 2/2006 | Hall et al. ...................... 336/132 |
| 7,040,415 B2 * | 5/2006 | Boyle ................... | E21B 17/023 175/40 |
| 7,053,788 B2 | 5/2006 | Hall et al. .................. 340/854.4 |
| 7,096,961 B2 | 8/2006 | Clark et al. | |
| 7,248,177 B2 | 7/2007 | Hall et al. .................. 340/854.8 |
| 7,319,410 B2 | 1/2008 | Hall et al. .................. 340/854.8 |
| 7,362,235 B1 | 4/2008 | Normann et al. ......... 340/854.8 |

(Continued)

OTHER PUBLICATIONS

International Search Report and Written Opinion issued in PCT/US2013/060166, mailed Dec. 20, 2013, 15 pages.

*Primary Examiner* — Firmin Backer
*Assistant Examiner* — Jerold Murphy
(74) *Attorney, Agent, or Firm* — John W. Wustenberg; Baker Botts L.L.P.

(57) ABSTRACT

A system and method for providing redundant wired pipe-in-pipe telemetry is described. The redundant wired pip-in-pipe telemetry system includes an outer pipe and an inner pipe disposed within the outer pipe. Within the outer pipe, two or more conductive elements may be provided as well as a wired path controller that may selectably switch between available conductive paths. The wired path controller may identify conductive paths with good electrical characteristics and select those paths for transmission. If a conductive path develops a fault, the wired path controller may select one of the alternative redundant conductive paths for transmission to avoid the fault. The wireless controller may further transmit information about the location of faults to a drill operator at the surface.

20 Claims, 9 Drawing Sheets

(56) References Cited

U.S. PATENT DOCUMENTS

| | | |
|---|---|---|
| 7,528,736 B2 | 5/2009 | Hall et al. ............... 340/854.9 |
| 8,242,928 B2 | 8/2012 | Prammer ................ 340/853.7 |
| 8,248,266 B2 | 8/2012 | Krueger et al. ......... 340/853.3 |
| 2006/0260797 A1 | 11/2006 | Hall et al. |
| 2007/0227727 A1 | 10/2007 | Patel et al. |
| 2009/0120689 A1* | 5/2009 | Zaeper ................. E21B 47/18 175/40 |
| 2010/0264650 A1 | 10/2010 | Braden et al. |
| 2011/0057810 A1 | 3/2011 | Partouche ............... 340/854.4 |
| 2012/0176138 A1 | 7/2012 | Prammer ..................... 324/338 |

* cited by examiner

REDUNDANT WIRED PIPE-IN-PIPE TELEMETRY SYSTEM

This application is a continuation-in-part of International Patent Application PCT/US2012/56624, filed on Sep. 21, 2012.

BACKGROUND

The present disclosure relates generally to well drilling operations and, more particularly, to a method and apparatus for redundant wired pipe-in-pipe telemetry.

Existing well drilling operations require information on formation characteristics to aid in drilling decisions. Numerous measurement techniques are used, including logging while drilling (LWD), measuring while drilling (MWD), and wireline tests. MWD operations, for example, utilize sensors downhole, which may measure certain formation characteristics. These measurements may be transmitted to the surface as telemetry data, which may be used to control drilling operations. Telemetry data is typically transmitted using mud pulses or custom drill pipe with an integrated wired connection. The custom drill pipe can be expensive to manufacture, however, given the pressure requirements for the drill string. Likewise, the mud pulses typically have limited data rates, capping the amount of real-time data that can be sent. Further, drill strings may be thousands of feet long and present a hostile environment for conductive paths, which may cause faults that impair or prevent signal transmission in those conductive paths.

FIGURES

Some specific exemplary embodiments of the disclosure may be understood by referring, in part, to the following description and the accompanying drawings.

While embodiments of this disclosure have been depicted and described and are defined by reference to exemplary embodiments of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DETAILED DESCRIPTION

The present disclosure relates generally to well drilling operations and, more particularly, to a method and apparatus for redundant wired pipe-in-pipe telemetry.

Illustrative embodiments of the present disclosure are described in detail herein. In the interest of clarity, not all features of an actual implementation may be described in this specification. It will of course be appreciated that in the development of any such actual embodiment, numerous implementation-specific decisions must be made to achieve the specific implementation goals, which will vary from one implementation to another. Moreover, it will be appreciated that such a development effort might be complex and time-consuming, but would nevertheless be a routine undertaking for those of ordinary skill in the art having the benefit of the present disclosure.

To facilitate a better understanding of the present disclosure, the following examples of certain embodiments are given. In no way should the following examples be read to limit, or define, the scope of the disclosure. Embodiments of the present disclosure may be applicable to horizontal, vertical, deviated, multilateral, u-tube connection, intersection, bypass (drill around a mid-depth stuck fish and back into the well below), or otherwise nonlinear wellbores in any type of subterranean formation. Embodiments may be applicable to injection wells, and production wells, including natural resource production wells such as hydrogen sulfide, hydrocarbons or geothermal wells; as well as borehole construction for river crossing tunneling and other such tunneling boreholes for near surface construction purposes or borehole u-tube pipelines used for the transportation of fluids such as hydrocarbons. Devices and methods in accordance with embodiments described herein may be used in one or more of MWD and LWD operations. Embodiments described below with respect to one implementation are not intended to be limiting.

Pipe-In-Pipe Telemetry

Figure 1:
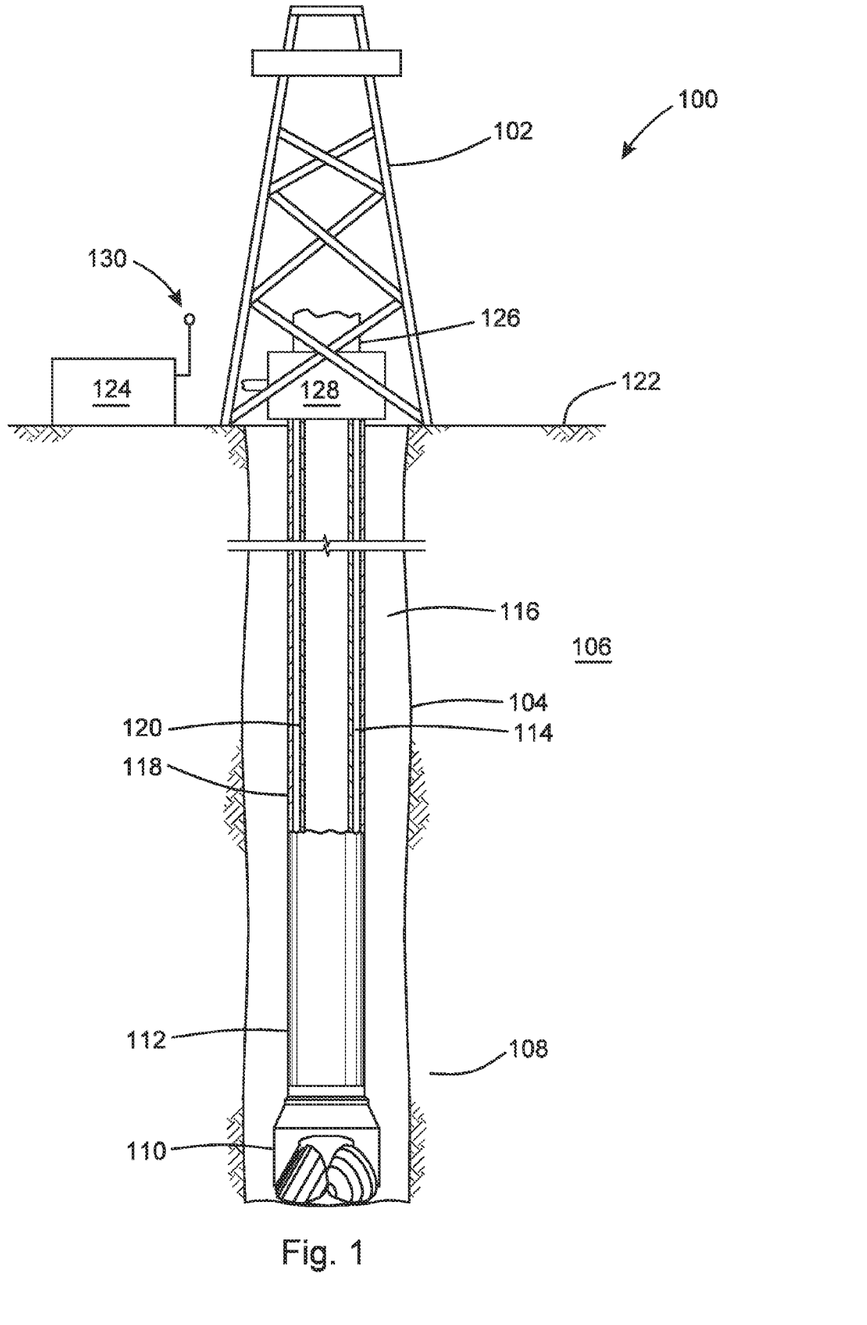
FIG. 1 illustrates an example drilling system.

FIG. 1 shows a drilling system 100. The drilling system 100 includes a rig 102 mounted at the surface 122, positioned above a borehole 104 within a subterranean formation 106. The rig 102 may be connected to multiple pipes 118 and 120 via a top drive 126. The drilling system 100 may include a pipe-in-pipe drilling system where an inner pipe 120 is disposed within the outer pipe 118. The outer pipe 118 may comprise a typical drill string that is used in conventional drilling operations. Fresh drilling mud may be pumped downhole toward the drill bit 110 through an annulus 114 between the inner pipe 120 and the drill string 118. The drilling mud may flow within the annulus 114 through bottom hole assembly (BHA) 108 to the drill bit 110. The BHA 108 may include a variety of measurement and logging such as various LWD/MWD elements 112, which are coupled to the outer pipe 118 and inner pipe 120. The drilling fluid may exit through the drill bit 110, lubricating the cutting surface as the drill bit rotates, and carrying cuttings from the formation back to the surface 122. In certain pipe-in-pipe telemetry systems, the drilling fluid may return to the surface 122 within annulus 116, or be diverted into inner pipe 120. A control unit 124 at the surface 122 may control the operation of at least some of the drilling equipment.

The drilling system 100 may be controlled, in part, using a telemetry system. A telemetry system may be used to transmit real-time drilling mechanics and formation evaluation information uphole as the well is drilled. In the pipe-in-pipe telemetry system shown in FIG. 1, LWD/MWD element 112 may make measurements regarding certain formation characteristics, and the measurements may be modulated or encoded and sent to the control unit 124 at the surface. The control unit 124 may receive the telemetry data or transmit commands/data via the surface flow diverter 128 over a communications cable or via a wireless network connection 130 or other mode of telemetry on surface. The control unit 124 may further demodulate the received data or modulate the transmitted commands or data, and translate the received data to some other useful form. For example, the measurements may be translated to evaluate certain formation characteristics, optimize the drilling system, or steer the drilling system to intersect a target formation. Likewise, the transmitted data or commands can be used to actuate a mechanism such as an under reamer to extend or retract its blades; to adjust the depth of cut with a bit control mechanism, such as a bit jack or other bit actuation mechanisms; to control tests; to control wellbore steering; and to adjust down hole drilling parameters, such as weight on bit and applied torque, by commanding down hole control mechanisms for these parameters. Further the system may be used to relay, exchange or receive data/commands/information to or from other subsurface modules within telemetry range of a secondary down hole transmitter or receiver. In existing systems, telemetry data is typically transmitted to the surface using mud pulses or a wired connection. Mud pulses may be sent to the surface using pressure waves in the drilling mud. Existing wired connections typically require a specially manufactured drill pipe with an integral wire. Unfortunately, the specially manufactured drill pipe is more expensive than standard drill pipe, and can significantly increase the overall costs of drilling operations. The manufacturing costs further may be exacerbated because the drill string is exposed to substantial pressures and torque during drilling, and therefore must be especially robust.

A pipe-in-pipe wired telemetry system may comprise an outer pipe and an inner pipe disposed within the outer pipe. As will be discussed below, a pipe-in-pipe wired telemetry system may utilize standard drill pipe as the outer pipe, reducing the overall system cost. A conductive element may be coupled to an outer surface of the inner pipe, disposed within an annulus between the outer surface of the inner pipe and the inner surface of the outer pipe. As will be appreciated by one of ordinary skill, the inner pipe of a pipe-in-pipe drilling system does not carry the string weight, which is born by the drill string or outer pipe. Accordingly, the inner pipe elements may be made of cast rather than machined, or with reduced machining effort subsequent to the cast, reducing the system cost.

Figure 2A:
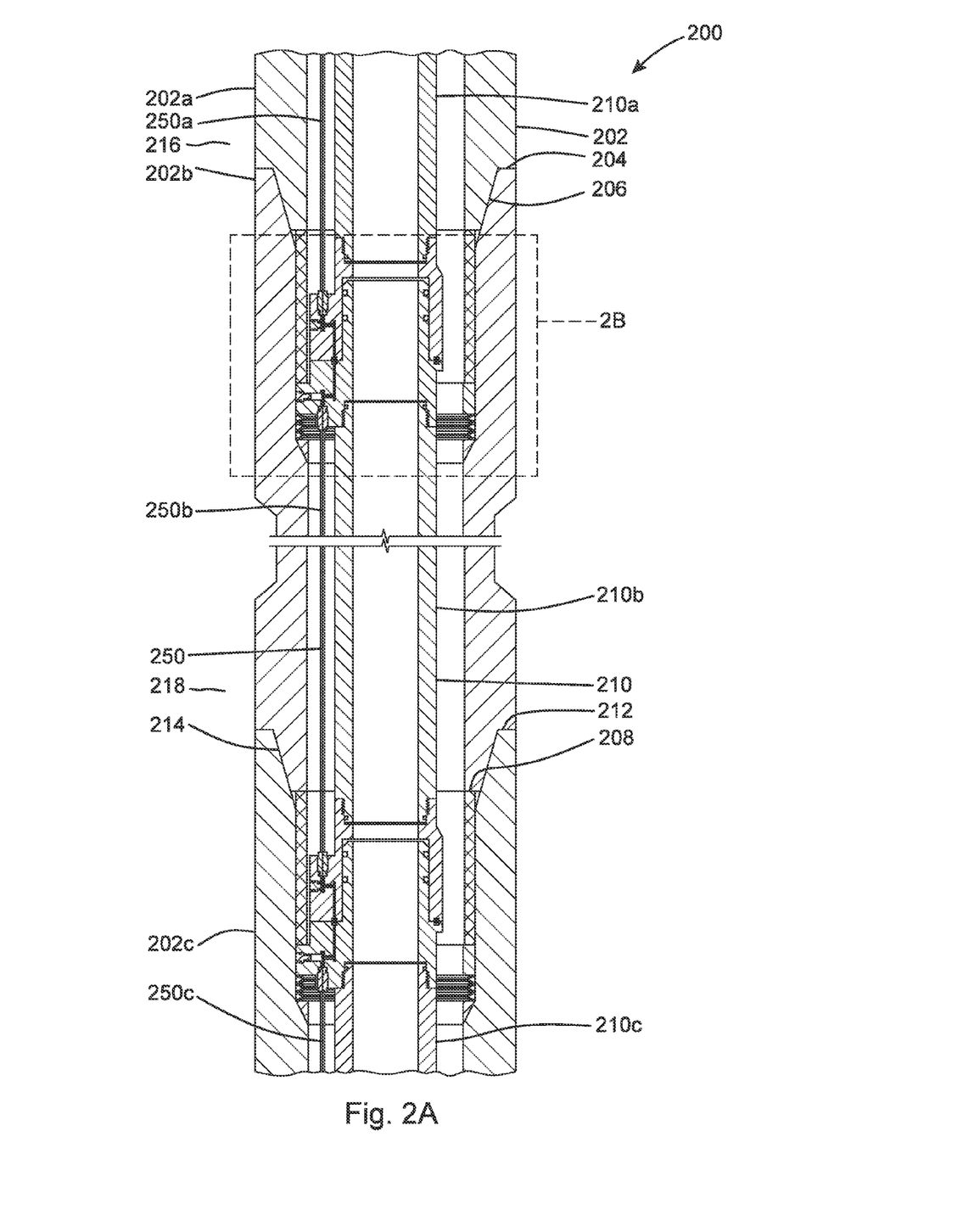
FIGS. 2A-C illustrate a cross-section of an example pipe-in-pipe wired telemetry system.
Figure 2B:
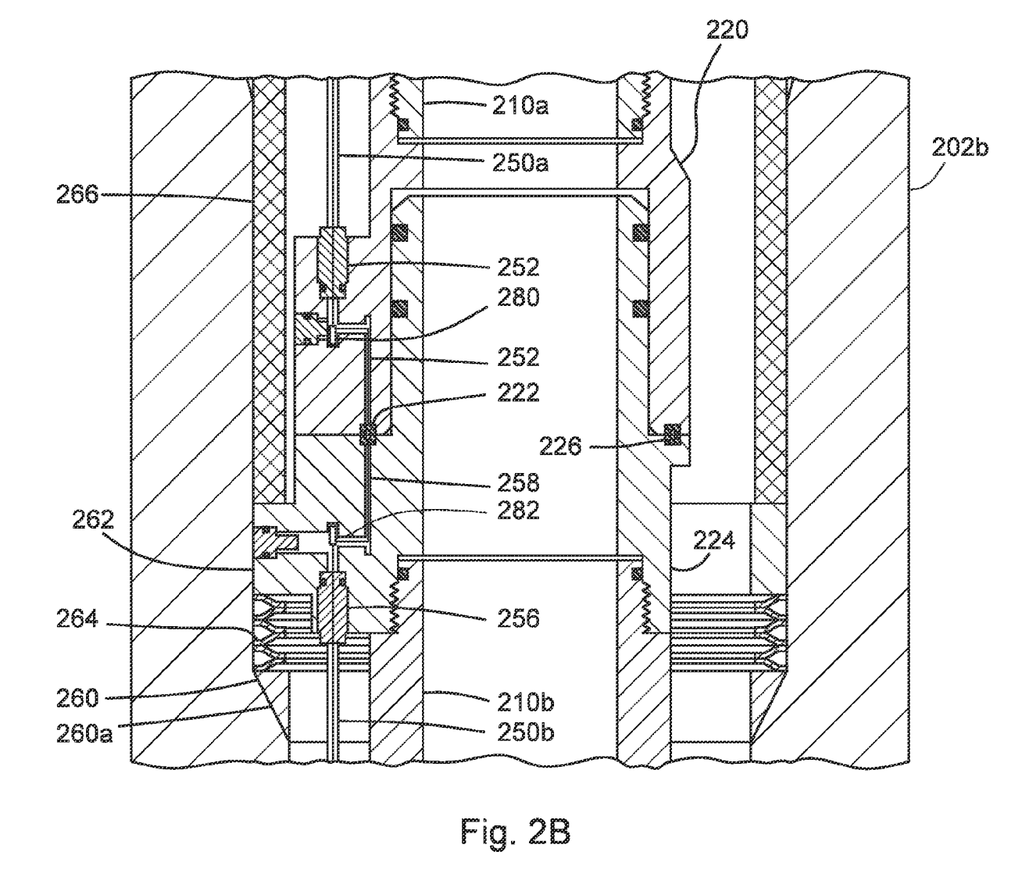

FIGS. 2A and 2B show elements of an example pipe-in-pipe telemetry system 200. The system 200 may include an outer pipe 202 and an inner pipe 210 disposed within the outer pipe 202. The outer pipe 202 may axially support the inner pipe 210, as will be explained below. A conductive element 250 may be coupled to and disposed proximate to an outer surface of the inner pipe 210, such that it is disposed in an annulus between the inner pipe 210 and the outer pipe 202. The conductive element 250 may comprise, for example a wire or segments of wire with an insulative layer to protect the wire from shorting against the inner pipe 210 or outer pipe 202. In certain pipe-in-pipe telemetry systems, a conduit may be used to sheath and protect the wire from damage. Telemetry signals may be sent along the conductive element 250. In certain pipe-in-pipe telemetry systems, telemetry signals may be sent along the conductive element 250 and also along one or both of the inner pipe 210 and outer pipe 202, thus making at least two electrical paths. Alternately a plurality of insulated conductive wires can be grouped together to form at least one conductive wire pair. Such pairs can reside in the same sheath or in separate protective sheaths (not shown). The telemetry signals may propagate in either direction along the conductor paths to and from downhole sensors and a control unit at the surface. As will be described below, locating the conductive element 250 in the annulus between the inner pipe 210 and outer pipe 202 may be advantageous by primarily exposing the conductive element 250 to clean, or mostly clean, drilling mud, instead of drilling mud which carries cuttings that may damage the conductive element 250.

In the pipe-in-pipe telemetry system shown, the outer pipe 202 may include a plurality of segments 202*a-c* mechanically and electrically connected at tool joints 216 and 218. In certain pipe-in-pipe telemetry systems, some or all of the plurality of segments 202*a-c* may be standard drill pipe segments that are coupled together to form a drill string, as will be appreciated by one of ordinary skill. Segment 202*b*, for example, may include an upper portion with an outer shoulder 204 and a threaded portion 206 disposed on an inner surface. Segment 202*b* may also comprise a bottom portion comprising an outer shoulder 212 disposed on an outer surface of the segment 202*b*, an inner shoulder 208 disposed on an inner surface of segment 202*b*, and a fastening portion 214. In certain pipe-in-pipe telemetry systems, the fastening portion 214 may comprise a threaded portion. In certain pipe-in-pipe telemetry systems, some or all of the segments of the outer pipe 202, including segments 202*a* and 202*c*, may comprise similarly configured upper and lower portions. The inner pipe segments need not be electrically connected to provide a mechanical seal and mechanical support and to prevent fluid exchange between the two fluid flow paths within the pipe-in-pipe drilling system.

In certain pipe-in-pipe telemetry systems, the conductive element 250, whether an insulated wire alone or an insulated wire within with a conduit, can be spiraled around the inner pipe 210 to reduce the likelihood that it will break due to pipe stretch. In other pipe-in-pipe telemetry systems, the conductive element 250 can include axial lengthwise loops to allow sliding members to expand or contract. The conductive element 250 may further be secured firmly or loosely to the outer surface of the inner pipe 210 with various means of fasteners or laid down in a support groove on or in the inner pipe material.

In certain pipe-in-pipe telemetry systems, segment 202*b* may be coupled to adjacent segments 202*a* and 202*c* at joints 216 and 218 along the outer pipe 202. Joints along the outer pipes may be characterized by two pipe segments being coupled together. In certain pipe-in-pipe telemetry systems, segment 202*b* may be coupled to segments 202*a* and 202*c* at joints 216 and 218 using threaded engagements. In the pipe-in-pipe telemetry system shown, the fastening portion 206 at the upper portion of segment 202*b* may engage with a fastening portion at the lower portion of segment 202*a*. Likewise fastening portion 214 at the lower portion of segment 202*b* may engage with a fastening portion at the upper portion of segment 202*c*. In certain pipe-in-pipe telemetry systems, joints 216 and 218 may further include compression engagements between shoulders on segment 202*b* and shoulders on segments 202*a* and 202*c*. For example, shoulder 204 of segment 202*b* may be compressed against an outer shoulder of segment 202*a* when the segments are coupled together. As can be seen, at some joints only one shoulder of a pipe segment may be engaged with a corresponding shoulder on an adjacent pipe segment. For example, shoulder 212 of segment 202*b* may engage with an outer shoulder of segment 202*c* at joint 216, but the inner shoulder 208 may not engage with a corresponding inner shoulder of segment 202*c*.

In certain pipe-in-pipe telemetry systems, the inner pipe 210 may comprise a plurality of inner pipe segments 210*a-c*, with the segments being coupled at or proximate to joints 216 and 218 of the outer pipe 202. Likewise, the conductive element 250 may comprise a variety of segments 250*a-c*, each being coupled together at or proximate to joints 216 and 218. As depicted in FIG. 2B, the inner pipe 210 may comprise a first collar 220 with a first connector 222 disposed therein. The first connector 222 may comprise, for example, one half of an electric coupling such as an inductive coupling, a conductive coupling, a capacitive coupling, and a piezo-electromechanical coupling. In certain pipe-in-pipe telemetry systems, the first connector 222 may comprise a coil of wire that is inserted into an inset on the bottom portion of the first collar 222, coaxial with the inner pipe 210.

The first connector 222 may be coupled to the conductive element 250, which may include being coupled to a segment 250a of the conductive element 250. The conductive element segment 250a may be coupled to the first connector 222 through element 252, which may comprise, for example, a coaxial coupling that corresponds to the geometry of the conductive element segment 250a. In certain pipe-in-pipe telemetry systems, conductive element segment 250a may comprise a coaxial wire, with the inner wire being coupled to a first end of the coil of wire forming first connector 222, and the insulating jacket of the coaxial cable being connected to a second end of the coil of wire forming first connector 222. Other arrangements are possible, however, depending on the configuration of the connector and the conductive element. A wire 254 disposed within the first collar 220 may couple the conductive element 250b to the first connector 222, such that signals can travel bi-directionally between the conductive element segment 250a and the first connector 222.

The inner pipe 210 may further comprise a second collar 224 with a second connector 226 disposed therein. The second connector 226 may comprise, for example, one half of an electric coupling such an inductive coupling, a conductive coupling, a capacitive coupling, and a piezo-electromechanical coupling, and may correspond to the coupling type of the first connector 222. For example, the second connector 226 may be a coil or partial loop of wire similar to first connector 222, except that it is disposed on a top surface of second collar 224. Likewise, the second connector 226 may be coupled to conductive element segment 250b similar to the way first connector 222 is coupled to conductive element segment 250a. The conductive element 250b may be coupled to the second connector 226 through element 256, which may comprise, for example, a coaxial coupling that corresponds to the geometry of the conductive element segment 250b, and may be similar to element 252. A wire 258 disposed within the second collar 226 may couple the conductive element 250b to the second connector 226, such that signals can travel bi-directionally between the conductive element 250b and the second connector 226.

In certain pipe-in-pipe telemetry systems, load balancing impedances 280 and 282 may be coupled to wires 254 and 258, respectively. The load balancing impedances 280 and 282 may help reduce signal deflection from the connectors at high data rates. In certain pipe-in-pipe telemetry systems, the load balancing impedances 280 and 282 may comprise a network of resistors, capacitors, and inductors that match the load on either end of an inner pipe segment to improve power transfer of the signal and reduce signal reflections.

As can be seen in FIG. 2b, the first collar 220 and the second collar 224 may align to form an electrical coupling between the first connector 222 and the second connector 226. In certain pipe-in-pipe telemetry systems, the first collar 220 and second collar 224 may be manufactured such that the first connector 222 and second connector 226 automatically align when the inner pipe 210 is assembled.

For example, in the pipe-in-pipe telemetry system shown, the second collar 224 may be at least partially installed within a bottom opening of the first collar 220, such that they form a substantially constant inner bore. When the second collar is at least partially installed within the first collar 220 the first connector 222 may align with the second connector 226 such that the first connector 222 and second connector 226 form an electrical coupling.

Figure 2C:
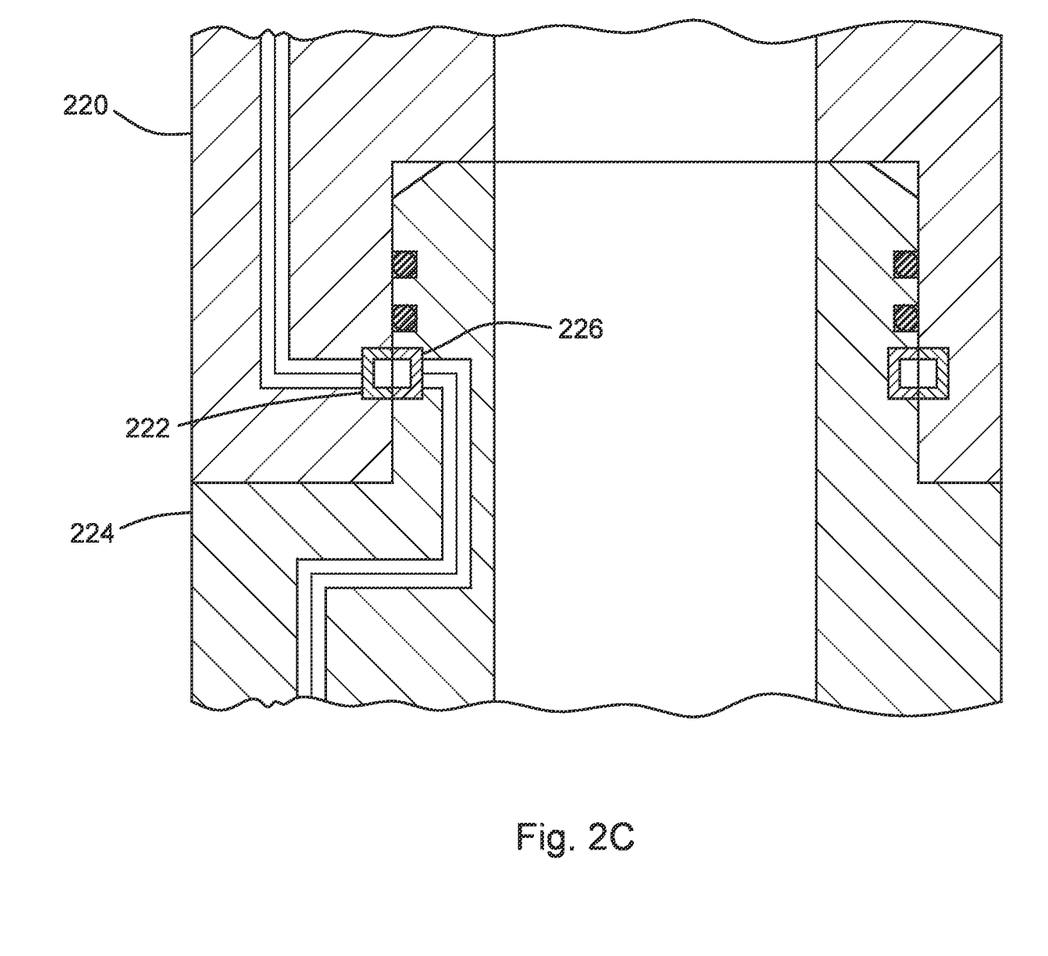

FIG. 2C shows an alternative location for first and second connectors 222 and 226, respectively. As can be seen, instead of being located on an abutting end portion of the first collar 220 and second collar 224, the first and second connectors 222 and 226 may be positioned within grooves on interior or exterior surfaces of the collars. As can be seen, first connector 222 may be located within a groove on an interior surface of the first collar 220. Likewise, second connector 226 may be located on an exterior surface of the second collar 224. When the second collar 224 is installed within the first collar 220, the first connector 222 and second connector 226 may align axially, creating an electrical coupling. Other placements for the first and second connectors 222 and 226 are possible, as would be appreciated by one of ordinary skill in the art.

Depending on the type of the first connector 222 and the second connector 226, the electrical coupling may comprise at least one of an inductive coupling, a conductive coupling, a capacitive coupling, and a piezo-electromechanical coupling. In certain pipe-in-pipe telemetry systems, the first connector 222 and the second connector 226 may be formed within the first collar 220 and second collar 224, respectively. The positioning of the first connector 222 and second connector 226 within collars may ensure that an electrical coupling is formed between the two connections. The electrical coupling may allow bi-directional communications and/or electric power transmission from the conductive element 250a to the conductive element 250b, through the collars 220 and 224. As will be appreciated by one of ordinary skill in the art, placing similar couplings throughout the length of the drilling string may effectuate wired telemetric communications with the surface.

In certain pipe-in-pipe telemetry systems, the outer pipe 202 may axially support the inner pipe 210. Axially supporting the inner pipe 210 may comprise limiting the axial movement of the inner pipe 210 within the outer pipe 202. In certain pipe-in-pipe telemetry systems, axially supporting the inner pipe 210 may also include applying a biasing force to the inner pipe 210 to maintain the electrical coupling between the first connector 222 and second connector 226. In the case of an inductive coupling, the biasing force allows the first connector 222 and second connector 226 to align and reduce the air gap between the two connectors. This may improve the magnetic or piezoelectric coupling between the first and second connectors 222 and 226, which may be otherwise difficult to maintain due to downhole pressures during installation and drilling operations.

In certain pipe-in-pipe telemetry systems, a shoulder 260 may be disposed on an inner surface of the outer pipe 202, and may axially support at least one of the first collar 220 and the second collar 226 on the inner pipe 210. The shoulder 260 may be integral to the outer pipe 202, or may comprise a wedge ring 260a installed within the outer pipe 202 such that in contacts a pipe hanger on an inner surface of the outer pipe 202, as is shown in FIGS. 2A and 2B.

Axial support for the inner pipe 210 may be provided by a compression member 264 positioned between the at least one of the first collar 220 and the second collar 224 and the shoulder 260. In the pipe-in-pipe telemetry system shown, the second collar 224 may comprise a projection 262, which may have a diameter similar to a diameter of an inner surface of the outer pipe 202. The compression member 264 may be positioned between the projection 262 and the shoulder 260, and may comprise a spring stack. As will be appreciated by one of ordinary skill in the art in view of this disclosure, as the inner pipe 210 is installed, the projection 262 may contact the compression member 264, which may impart a first axial force in a first direction on the projection 262 and the second collar 224. The first direction of the first axial force may be opposite a second direction of a second axial force generated by the weight of the inner pipe 210 on the projection 262, thereby urging the first connection 222 toward the second connection 226. Although the projection 262 is shown extending from the second collar 224, other locations are possible, such as one the first collar 220, or on one of the pipe segments.

In certain pipe-in-pipe telemetry systems, the pipe-in-pipe wired telemetry system 200 may further comprise a tensioning member 266 positioned between the projection 262 and an unengaged shoulder of an outer pipe segment, such as segment 202a. The tensioning member 266 may impart a static load on the compression member 264 when the telemetry system 200 is assembled. For example, before outer pipe segment 202a is coupled to segment 202b, the wedge ring 260a, compression member 264, second collar 224, and tensioning member 266 may be positioned within the outer pipe 202. As the segment 202a is threadedly engaged with segment 202b, the tensioning member 266 may contact an inner shoulder of segment 202a, causing the tensioning member 266 to impart a static load on the compression member 264. The static load may depend, for example, on a spring force of the compression member 264 and the distance which the tensioning member 266 causes the compression member 264 to compress under static conditions. As will be appreciated by one of ordinary skill in view of this disclosure, the static force may be altered by changing the length of the tensioning member 266. Likewise, the static force may be configured such that the first connection 222 and second connection 226 are urged together with a pre-determined biasing force that corresponds to the force required to maintain the electrical coupling between the first connection 222 and the second connection 226.

Figure 3A:
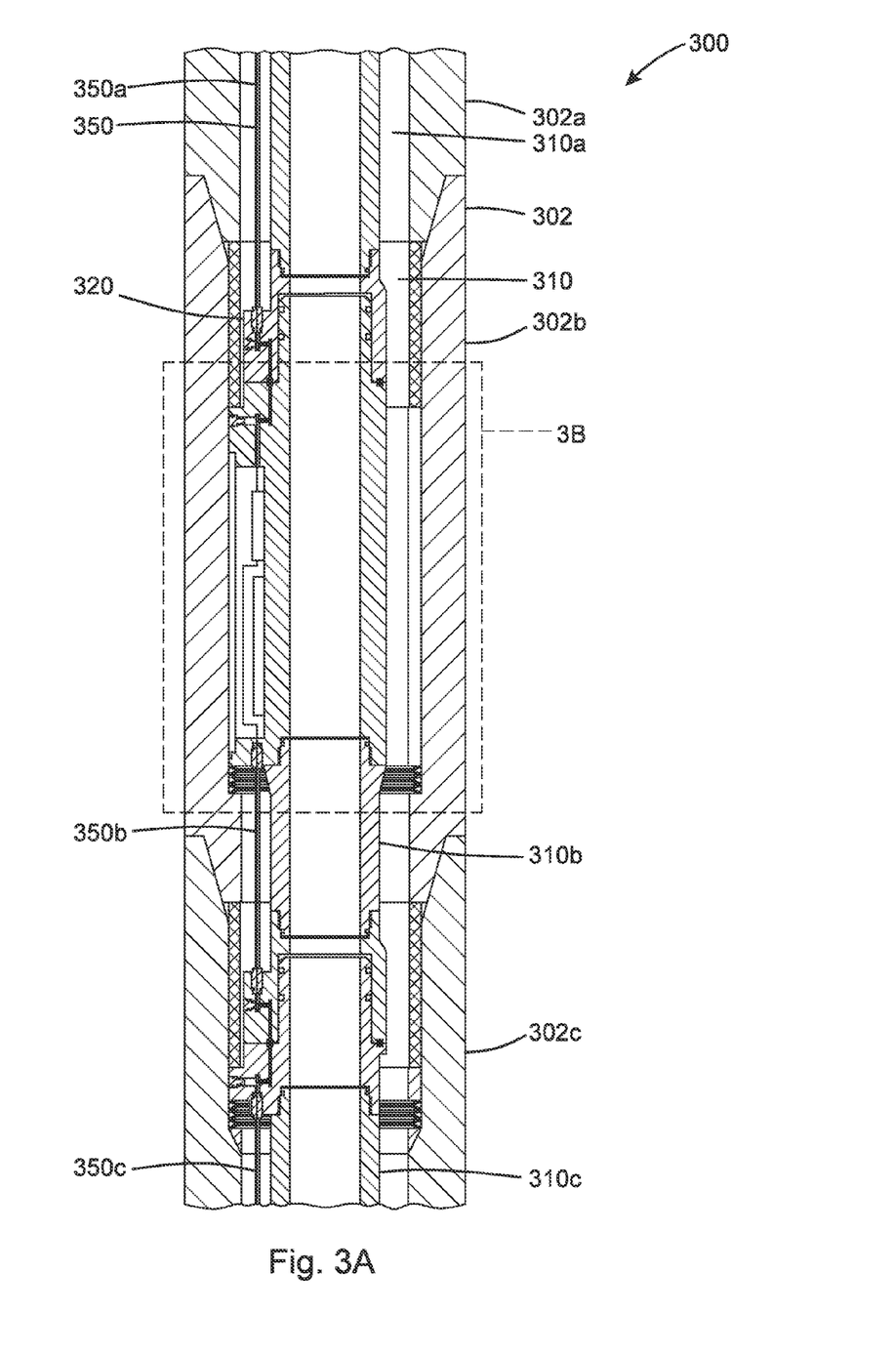
FIGS. 3A-B illustrate a cross-section of an example pipe-in-pipe wired telemetry system.
Figure 3B:
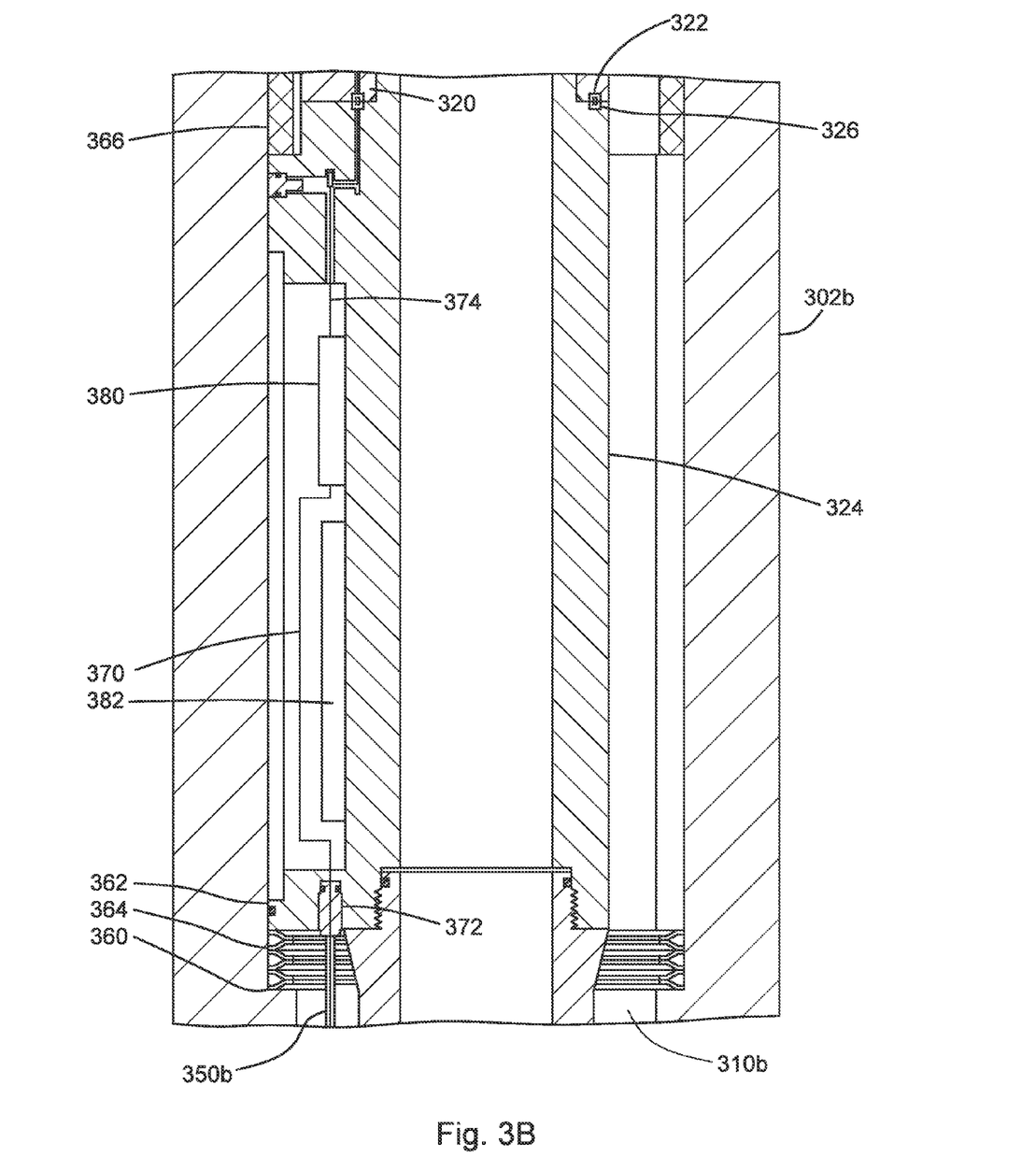

FIGS. 3A and 3B show elements of an example pipe-in-pipe telemetry system 300. Like the system 200, the system 300 may include an outer pipe 302 and an inner pipe 310 disposed within the outer pipe 302. The outer pipe 302 may axially support the inner pipe 310. A conductive element 350 may be coupled to and disposed proximate to an outer surface of the inner pipe 310, such that it is disposed in an annulus between the inner pipe 310 and the outer pipe 302. The conductive element 350 may comprise, for example, a wire or segments of wire 350a and 350b with an insulative layer to protect the wire from shorting against the inner pipe 310 or outer pipe 302. Telemetry signals may be sent along the conductive element 350 from downhole sensors to a control unit at the surface. Unlike the system 200, however, the system 300 further comprises one or more signal repeaters 380 (one is shown) coupled to the conductive element 350. Such signal repeaters may be included in any pipe-in-pipe telemetry system.

The outer pipe 302 may include a plurality of segments 302a-c which are similar to segments 202a-c, and which may be coupled together in a similar fashion. For example, some or all of segments 302a-c may comprise standard drill pipe coupled together to form a drill string. Likewise, the inner pipe 310 may comprise a plurality of inner pipe segments 310a-c which are similar to segments 210a-c described above. Additionally, the inner pipe 310 may comprise a first collar 320 with a first connector 322 disposed therein, and a second collar 324 within a second connector 326 disposed therein, with the first and second connectors 322 and 326, respectively, being positioned and functioning similar to the first and second connectors 222 and 226. The outer pipe 302 may further axially support the inner pipe 310, including providing a biasing force via shoulder 360, projection 362, compression member 364, and tensioning member 366.

In the pipe-in-pipe telemetry system shown, the second collar 324 may be elongated to accommodate the signal repeater 380. As can be seen, the signal repeater 380 may be coupled to the conductive element 350b via wire 370 and element 372. Element 372 may be a coaxial connector similar to element 256 in FIG. 2B. The signal repeater 380 may also be coupled to connector 326 via wire 374. The signal repeater 380 may receive bi-directional communications, and retransmit the signal, boosting the power of the signal and ensuring that a signal of sufficient strength is either reached at the surface or at the following signal repeater. As will be appreciated by one of ordinary skill in the art in view of this disclosure, drill strings may be thousands of feet long, and signals transmitted over a wire may lose signal strength, increasing the signal to noise ratio in the transmission. This may lead to errors in the transmission. By incorporating one or more signal repeaters, the signal strength may be maintained and the transmission errors reduced.

The signal repeater 380 may comprise a controller and a memory element such that it can temporarily buffer and re-transmit the signal. The signal repeater 380 may be coupled to a power source 382 positioned proximate the signal repeater to power the controller and memory element and provide the necessary power to re-transmit the telemetry signal. As will be appreciated by one of ordinary skill in the art in view of this disclosure, the signal repeater 380 may be programmed to accommodate a variety of signals and frequencies, depending on the application.

As can be seen, shoulder 360 of segment 302b may be positioned to accommodate the elongated second collar 324. Segments 202a-c, for example, may comprise standard drill pipe segments with a pipe hangar interface located at substantially the same axial location along the segment. Segment 302b, in contrast, includes an integral shoulder 360 that is positioned axially lower within the segment 302, to allow for the installation of the elongated second collar 324 with the signal repeater 380 while still accommodating compression member 364 and tensioning member 366. Accordingly, the outer pipe 302 may still axially support inner pipe 310, including providing a biasing force, even though custom drill pipe segments are used. As will be appreciated by one of ordinary skill, custom drill pipe segments may be included at multiple locations throughout the drill string. Likewise, although the signal repeater 380 is shown positioned within second collar 324, it may be positioned elsewhere within the pipe-in-pipe telemetry system described herein. In certain pipe-in-pipe telemetry systems, the signal repeater 380 may be installed within a custom outer pipe segment 302b.

A method for a pipe-in-pipe telemetry system may include introducing an outer pipe into a borehole. The outer pipe may comprise standard drill pipe and introducing the outer pipe into a borehole may comprise attaching additional drill pipe segments to a drill pipe that is at least partially disposed within the borehole. The method may also include positioning an inner pipe within the outer pipe. In certain pipe-in-pipe telemetry systems, as the outer pipe segments are attached, the inner pipe segments may be positioned and installed within the outer pipe. As described above, positioning the inner pipe within the outer pipe may include using the outer pipe to axially support the inner pipe. As also described above, the inner pipe may include a projection which may be axially supported by at least one of a shoulder, compression member, and tensioning member.

The method may further include coupling a conductive element to the inner pipe. In certain pipe-in-pipe telemetry systems, the inner pipe may include a first collar with a first connection and a second collar with a second connection. Coupling a conductive element to the inner pipe may comprise coupling a first segment of the conductive element to the first connector and coupling a second segment of the conductive element to the second connector. The first connector and second connector may form an electrical coupling, allowing telemetry signals to be transmitted along the conductive element. A projection of the inner pipe may be disposed on at least one of the first collar and the second collar. As described above, axially supporting the projection may comprise applying a biasing force to the projection to maintain an electrical coupling between the first connector and the second connector. The method may further include transmitting telemetry data through the conductive element.

Redundant Wired Pipe-In-Pipe Telemetry

As will be appreciated by one of ordinary skill in light of this disclosure, a method and apparatus for redundant wired pipe-in-pipe telemetry may be used in any of the above-described pipe-in-pipe telemetry systems. Redundancy may be achieved by adding to any of the above-described pipe-in-pipe telemetry systems at least one additional electrically conductive path, although further redundancy may be achieved by providing more than one additional electrically conductive path. A wired path controller may be provided to select between the available conductive paths. The controller may identify conductive paths with good electrical characteristics and select those paths for transmission. If a path develops a fault, the controller may select one of the alternative redundant paths for transmission to avoid the fault.

Figure 4A:
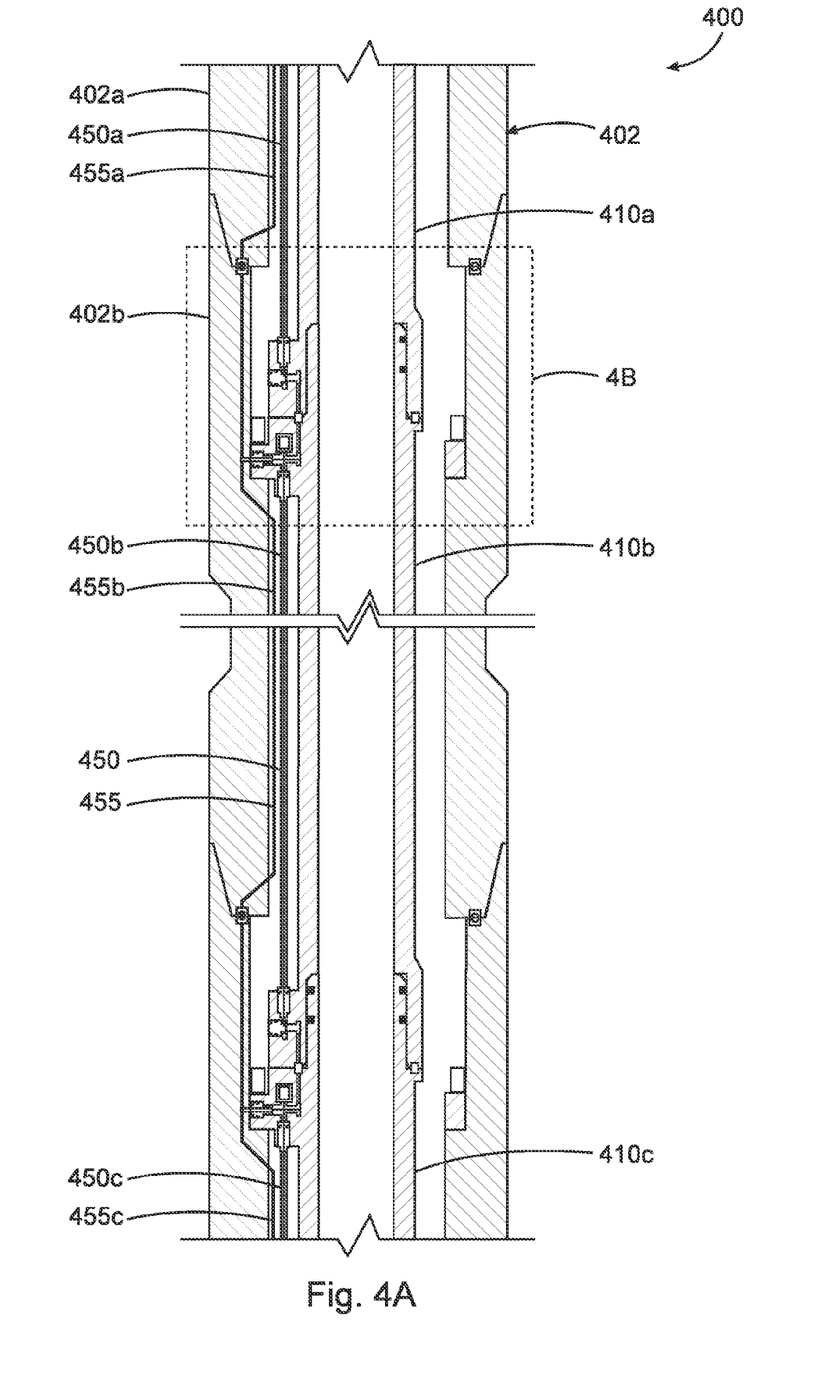
FIGS. 4A-B illustrate a cross-section of an example redundant wired pipe-in-pipe telemetry system, according to aspects of the present disclosure.
Figure 4B:
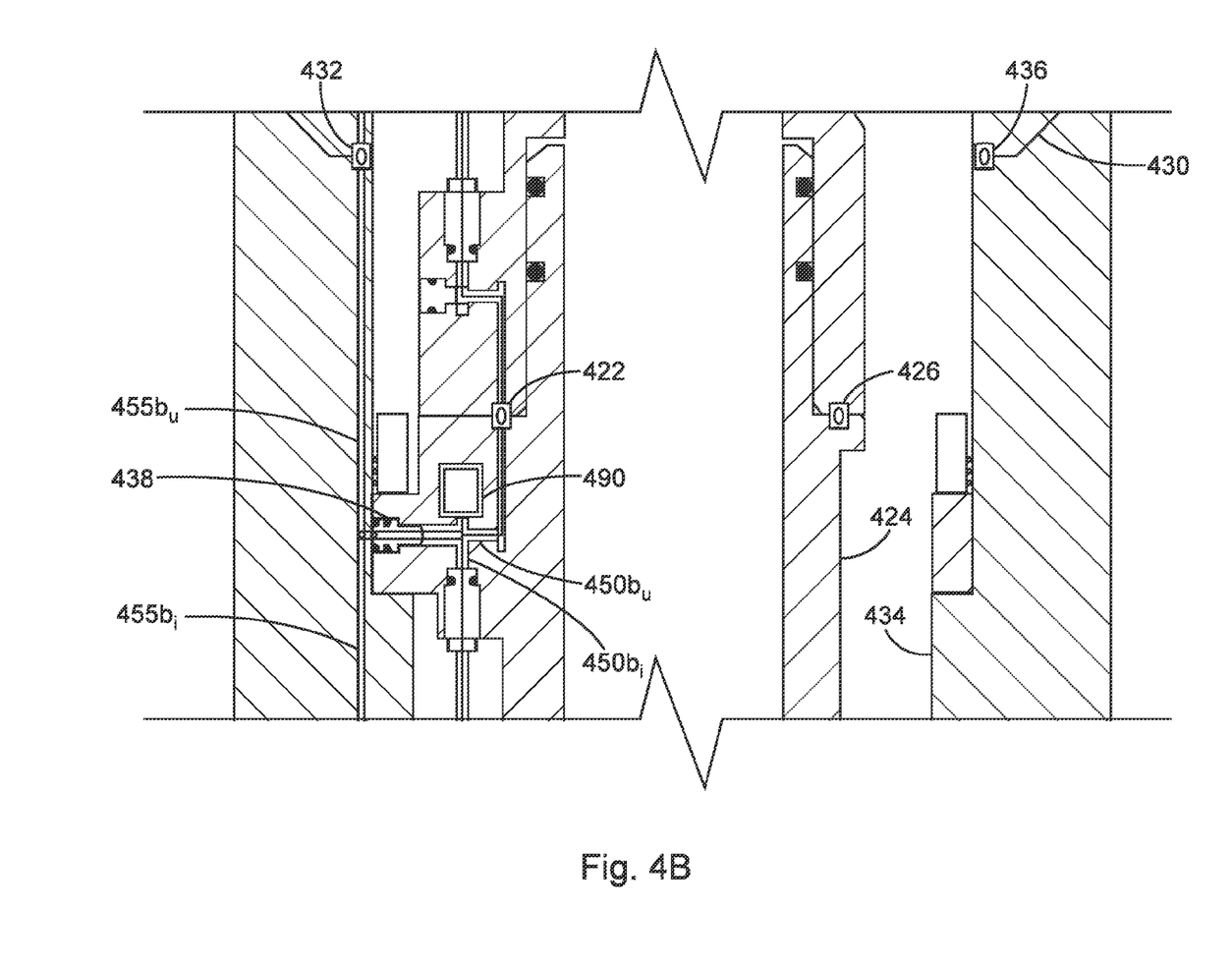

FIGS. 4A and 4B show an embodiment of a redundant wired pipe-in-pipe telemetry system 400. Like the pipe-in-pipe telemetry system 200, the redundant wired pipe-in-pipe telemetry system 400 may include an outer pipe 402 and an inner pipe 410 disposed within the outer pipe 402. The outer pipe 402 may include a plurality of segments 402a-c, which are similar to segments 202a-c and which may be coupled together in a similar fashion. For example, some or all of segments 402a-c may comprise standard drill pipes coupled together to form a drill string. Likewise, the inner pipe 410 may comprise a plurality of inner pipe segments 410a-c which are similar to segments 210a-c described above. The inner pipe 410 may comprise a first inner-pipe collar 420 with a first inner-pipe connector 422 disposed therein, and a second inner-pipe collar 424 with a second inner-pipe connector 426 disposed therein. The first and second inner-pipe connectors 422 and 426 are positioned and function similarly to the first and second connectors 222 and 226 described above. The first and second inner-pipe collars 420 and 424 may align to form an electrical coupling between the first and second inner-pipe connectors 422 and 426.

Also similar to the pipe-in-pipe telemetry system 200, a first conductive element 450 may be coupled to and disposed proximate to an outer surface of the inner pipe 410, such that it is disposed in an annulus between the inner pipe 410 and the outer pipe 402. The first conductive element 450 may comprise, for example, a wire or segments of wire 450a-c with an insulative layer to protect the wire from shorting against the inner pipe 410 or outer pipe 402. As previously described with respect to the system 200 and wire segments 250a-c, wire segments 450a-c may be electrically connected across the segments of inner pipe 410 by means of connectors, such as first and second inner-pipe connectors 422 and 426, thereby forming a conductive path for bi-directional communication.

Unlike the system 200, however, the system 400 further comprises a second conductive element, shown in this embodiment as second conductive element 455 coupled to and disposed proximate to an inner surface of the outer pipe 402. Second conductive element 455 may compromise, for example, a wire or segments of wire 455a, 455b, and 455c with an insulative layer to protect the wire from shorting against the outer pipe 402. Second conductive element 455 is electrically parallel to, and thus redundant of, first conductive element 450. Such a redundant second conductive element may be included in any pipe-in-pipe telemetry system, and those of skill in the art will appreciate alternative possible configurations for a second conductive element, such as disposing the second conductive element proximate to the inner pipe 410.

In the embodiment shown, where second conductive element 455 is disposed proximate to the inner surface of the outer pipe 402, the outer pipe 402 may comprise first outer-pipe collar 430 with a first outer-pipe connector 432 disposed therein, and a second outer-pipe collar 434 with a second outer-pipe connector 436 disposed therein. The first and second outer-pipe connectors 432 and 436 may be similar in functionality to the first and second inner-pipe connectors 422 and 426, described above. Similarly to wire segments 450a-c, wire segments 455a-c may be electrically connected across the segments of outer pipe 402 by means of connectors, such as first and second outer-pipe connectors 432 and 436, thereby forming a conductive path for bi-directional communication.

In the embodiment shown, a wired path controller 490 is located inside a second inner-pipe collar 424. However persons of ordinary skill will appreciate that the wired path controller 490 may be placed in alternative locations without departing from the scope of the present disclosure. Regardless of the location of wired path controller 490, first conductive path 450 and the second conductive path 455 may be electrically coupled to the wired path controller 490. In the embodiment shown, wired path controller 490 is coupled to the first conductive path 450 at path segment 450b and may subdivide the segment 450b into an upper segment $450b_u$ and a lower segment $450b_l$. Similarly, in the embodiment shown, the wired path controller 490 may be coupled to the second conductive path 455 at path segment 455b via an inner-pipe-to-outer-pipe connector 438. The inner-pipe-to-outer-pipe connector 438 may be similar to the first and second inner-pipe connectors 422 and 426, as well as the first and second outer-pipe connectors 432 and 436. Further to preserve the electrical connection across the inner-pipe-to-outer-pipe connector, an optional retainer nut 470 may be provided, which is affixed to the outer pipe 402. The coupling of the segment 455b to the wired path controller 490 may subdivide the segment 455b into an upper segment $455b_u$ and a lower segment $455b_l$.

The wired path controller 490 may switchably select to create electronic connections among the conductive path segments coupled to it. Each possible combination of conductive path segments is a selectable signal pathway through the controller. For example, the wired path controller 490 may switchably select to electronically connect the first upper segment $450b_u$ and the first lower segment $450b_l$. Similarly, the wired path controller 490 may switchably select to electronically connect the second upper segment $455b_u$ and the second lower segment $455b_l$, the first upper segment $450b_u$ and the second lower segment $455b_l$, and/or the second upper segment $455b_u$ and the first lower segment $450b_l$. Thus, wired path controller 490 includes at least four selectable signal pathways.

As will be appreciated by one of ordinary skill in the art in view of this disclosure, drill strings may be thousands of feet long and present a hostile environment for conductive paths, which causes faults that impair or prevent signal transmission in those conductive paths. By incorporating one or more wired path controllers, conductive paths suffering from faults can be de-selected and signals instead may be routed through other functional, redundant conductive paths. If a plurality of wired path controllers is used, they may be placed at variable intervals throughout the drill string. Thus, in certain embodiments, wired path controllers may be placed in each drill pipe segment, but in other embodiments, wired path controllers may be placed farther apart such that the conductive path segments between each wired path controller span multiple drill pipe segments.

The wired path controller 490 may identify faults using techniques well known to those of skill in the art, such as polling, detecting drops in data transmission rates, or sweep frequency response analysis. Implementation of such techniques is well known to those of ordinary skill in the art and will therefore not be discussed in detail herein. Optionally, the wired path controller 490 may be configured to latch or otherwise store its switch configuration when powered off, such that the selection of communication paths is retained until power is restored.

Figure 5A:
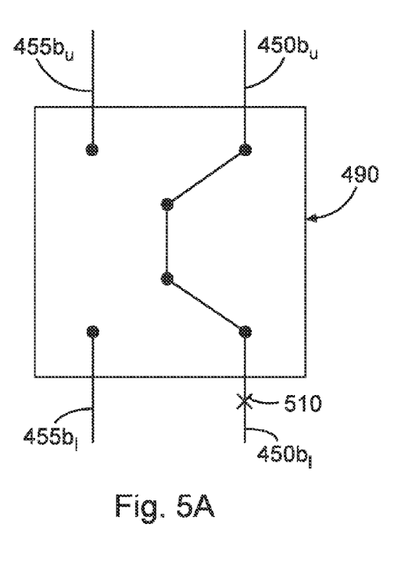
FIGS. 5A-C illustrate example configurations of a wired path controller, according to aspects of the present disclosure.
Figure 5B:
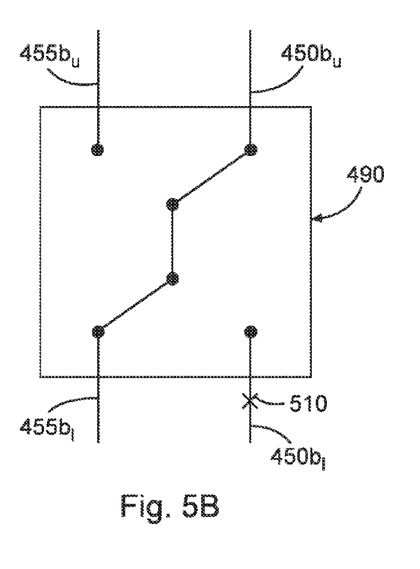
Figure 5C:
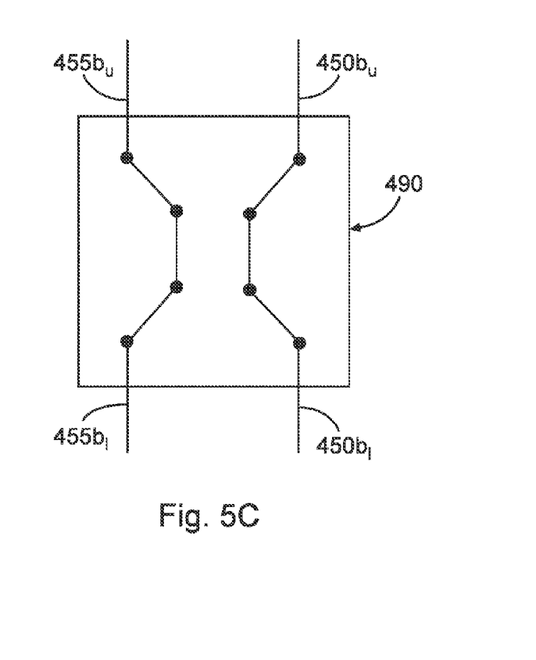

FIGS. 5A-C depict example configurations of the wired path controller 490. One of skill in the art will appreciate that FIGS. 5A-C show a simplified depiction of the selectable switches that may be included in the wired path controller 490 and that wired path controller 490 may contain additional circuitry not shown in FIGS. 5A-C, such as circuitry for detecting faults and/or storing the selection of communication paths.

In FIG. 5A, for example, the wired path controller 490 has switchably selected to connect the first upper segment $450b_u$ and the first lower segment $450b_l$, and a fault 510 is present on the first lower segment $450b_l$. In FIG. 5B, the wired path controller 490 has detected the fault 510, switchably selected to disconnect the first upper segment $450b_u$ from the faulty first lower segment $450b_l$, and connected the first upper segment $450b_u$ to the second lower segment $455b_l$. Accordingly, wired path controller 490 may switchably select among non-faulty redundant signal pathways in order to route the communications signals around a detected fault, such as fault 510.

Instead of being configured to switchably select only two segments to form a single conductivity path, as shown in FIGS. 5A and 5B, the wired path controller 490 may optionally be configured to switchably select segments so as to form separate, parallel conductive paths. In FIG. 5C, for example, the wired path controller 490 has switchably selected to form two conductive paths. A first conductive path is formed by connecting the first upper segment $450b_u$ and the first lower segment $450b_l$. Similarly, a second conductive path is formed by connecting the second upper segment $455b_u$ and the second lower segment $455b_l$. In this way, two separate, parallel conductive paths may be provided through the drill string.

In a preferred embodiment, a wired path controller may be configured to receive commands sent using electronic signals transmitted via conductive paths. Such commands could include, but are not limited to, instructions regarding which signal pathways to switchably select. Similarly, in certain embodiments, a wired path controller may be configured to send information or commands via electronic signals transmitted through conductive paths. For example, when a fault is identified, a wired path controller may be configured to send information concerning the location of the fault to the surface so that a drill operator may determine how much drill pipe must be pulled to replace the pipe segment containing the fault. In one embodiment, each wired path controller may be assigned a unique network identification number. Accordingly, if a fault is detected, the unique network identification number of the nearest wired path controller may be sent to the surface.

A person of ordinary skill in the art will appreciate that the functionality of a signal repeater, such as signal repeater 380 shown in FIG. 3B and described above with respect to the pipe-in-pipe telemetry system 300, may optionally be included in a wired path controller in accordance with an embodiment of the present disclosure. Specifically, a drill string may incorporate one or more wired path controllers, all of which may selectably switch among available redundant paths and one or more of which may also retransmit received signals. Such retransmission may boost the power of the signal and ensure that a signal of sufficient strength is delivered to either the surface or the following signal repeater. Consequently, signal strength may be maintained and transmission errors reduced.

A person of ordinary skill in the art will also appreciate that the present disclosure is not limited to any specific number of conductive paths. Accordingly, one or more additional conductive paths may be utilized without departing from the scope of the present disclosure. For example, in addition to the previously-described first conductive path that may be disposed in the annulus between the inner and outer pipe and the previously-described second conductive path that may be disposed proximate to the outer pipe, a third conductive path may be disposed inside the inner pipe. Alternatively, multiple conductive paths that are each individually insulated could be provided in the annulus between the inner and outer pipe. In such alternative embodiments, the wired path controllers may be configured to switchably select to form two or more separate, parallel conductive paths through the drill string.

An embodiment is a redundant wired telemetry system including an outer pipe; an inner pipe disposed within the outer pipe, wherein the outer pipe axially supports the inner pipe; a first conductive element coupled to the inner pipe and disposed within an annulus between the inner pipe and the outer pipe; and a second conductive element disposed within the outer pipe.

The system may optionally include a wired path controller coupled to at least one of the first conductive element and the second conductive element. The first conductive element may optionally include a first upper portion and a first lower portion; and the second conductive element may optionally include a second upper portion and a second lower portion.

The system may optionally include a first signal pathway through the wired path controller. The first signal pathway may optionally include one of the following combinations: the first upper portion and the first lower portion; the second upper portion and the second lower portion; the first upper portion and the second lower portion; and the second upper portion and the first lower portion. The system may optionally include a second signal pathway through the wired path controller.

The wired path controller may optionally include a switch that selects at least one of the first signal pathway and the second signal pathway. The wired path controller may selectably switch between the first signal pathway and the second signal pathway in response to a fault in one of the first upper portion, the second upper portion, the first lower portion, and the second lower portion. The wired path controller may optionally include a signal repeater.

The system may optionally include a third conductive element disposed within the outer pipe.

An embodiment is a method for redundant wired pipe-in-pipe telemetry, including introducing an outer pipe into a borehole; positioning an inner pipe within the outer pipe, wherein the outer pipe axially supports the inner pipe; coupling a first conductive element to the inner pipe, wherein the first conductive element is disposed within an annulus between the inner pipe and the outer pipe; coupling a second conductive element to the outer pipe, wherein the second conductive element is disposed proximate to the outer pipe; and transmitting telemetry data through at least one of the first and second conductive element.

The method may optionally include providing a wired path controller coupled to at least one of the first conductive element and the second conductive element. The method may optionally include detecting faults in at least one of the first and second conductive elements using the wired path controller.

The method may optionally include switchably selecting between the first and second conductive elements using the wired path controller. The wired path controller optionally may switchably select the first and second conductive elements as parallel conductive paths.

The method may optionally include transmitting information about the location of faults to an operator. The method may optionally include assigning the wired path controller a network identification number.

The wired path controller may optionally include a signal repeater.

The method may optionally include providing a third conductive element within the outer pipe.

An embodiment is a wired telemetry system including an outer pipe, wherein the outer pipe comprises a shoulder disposed on an inner surface; an inner pipe disposed within the outer pipe, wherein the inner pipe comprises a projection that is axially supported by the shoulder; a first conductive element coupled to the inner pipe and disposed within an annulus between the inner pipe and the outer pipe; and a second conductive element disposed within the outer pipe.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. Also, the terms in the claims have their plain, ordinary meaning unless otherwise explicitly and clearly defined by the patentee. The indefinite articles "a" or "an," as used in the claims, are defined herein to mean one or more than one of the element that it introduces. Additionally, the terms "couple", "coupled", or "coupling" include direct or indirect coupling through intermediary structures or devices.

What is claimed is:

1. A redundant wired telemetry system, comprising:
   an outer pipe;
   an inner pipe disposed within the outer pipe, wherein the outer pipe axially supports the inner pipe using a collar of the inner pipe;
   a first conductive element coupled to the inner pipe and disposed at least partially within an annulus between the inner pipe and the outer pipe;
   a second conductive element disposed within the outer pipe;
   a wired path controller coupled to the collar of the inner pipe, wherein the wired path controller is coupled to each of the first conductive element and the second conductive element, and wherein the wired path controller is configured to switch between the first conductive element and the second conductive element in response to a detected fault in one of the first conductive element or the second conductive element; and
   a connector coupled to the collar of the inner pipe, wherein the connector couples the second conductive element to the wired path controller.

2. The redundant wired telemetry system of claim 1, further comprising a third conductive element disposed within the outer pipe.

3. The redundant wired telemetry system of claim 1, wherein:
   the first conductive element comprises a first upper portion and a first lower portion; and
   the second conductive element comprises a second upper portion and a second lower portion.

4. The redundant wired telemetry system of claim 3, further comprising a first signal pathway through the wired path controller.

5. The redundant wired telemetry system of claim 4, wherein the first signal pathway comprises one of the following combinations:
   the first upper portion and the first lower portion;
   the second upper portion and the second lower portion;
   the first upper portion and the second lower portion; and
   the second upper portion and the first lower portion.

6. The redundant wired telemetry system of claim 4, further comprising a second signal pathway through the wired path controller.

7. The redundant wired telemetry system of claim 6, wherein the wired path controller includes a switch that selects at least one of the first signal pathway and the second signal pathway.

8. The redundant wired telemetry system of claim 7, wherein the wired path controller selectably switches between the first signal pathway and the second signal pathway in response to a fault in one of the first upper portion, the second upper portion, the first lower portion, and the second lower portion.

9. The redundant wired telemetry system of claim 1, wherein the wired path controller includes a signal repeater.

10. The redundant wired telemetry system of claim 1, wherein:
    a first segment of the first conductive element and a second segment of the first conductive element are coupled together using an electric coupling, the electric coupling chosen from the group consisting of: an inductive coupling, a conductive coupling, a capacitive coupling, or a piezo-electromechanical coupling.

11. The redundant wired telemetry system of claim 10, wherein:
the inner pipe includes a first inner pipe segment and a second inner pipe segment, the first inner pipe segment including a first half of the electric coupling, the second inner pipe segment including a second half of the electric coupling;
the first segment of the first conductive element is coupled to the first half of the electric coupling; and
the second segment of the first conductive element is coupled to the second half of the electric coupling.

12. A method for redundant wired pipe-in-pipe telemetry, comprising:
introducing an outer pipe into a borehole;
positioning an inner pipe within the outer pipe, wherein the outer pipe axially supports the inner pipe using a collar of the inner pipe, the collar of the inner pipe comprising a connector coupled thereto;
coupling a first conductive element to the inner pipe, wherein the first conductive element is disposed at least partially within an annulus between the inner pipe and the outer pipe;
coupling a second conductive element to the outer pipe, wherein the second conductive element is disposed proximate to the outer pipe;
coupling a wired path controller to each of the first conductive element and the second conductive element;
coupling the second conductive element to the wired path controller using the connector;
transmitting telemetry data through at least one of the first and second conductive element;
detecting faults in at least one of the first and second conductive elements using the wired path controller; and
switching between the first and second conductive elements using the wired path controller in response to detecting faults in at least one of the first and second conductive elements.

13. The method of claim 12, wherein:
coupling the first conductive element to the inner pipe comprises coupling a first segment of the first conductive element to a second segment of the first conductive element together using an electric coupling, the electric coupling chosen from the group consisting of: an inductive coupling, a conductive coupling, a capacitive coupling, or a piezo-electromechanical coupling.

14. The method of claim 13, wherein:
the inner pipe includes a first inner pipe segment and a second inner pipe segment, the first inner pipe segment including a first half of the electric coupling, the second inner pipe segment including a second half of the electric coupling;
the first segment of the first conductive element is coupled to the first half of the electric coupling; and
the second segment of the first conductive element is coupled to the second half of the electric coupling.

15. The method of claim 11, wherein the wired path controller may switchably select the first and second conductive elements as parallel conductive paths.

16. The method of claim 11, further comprising transmitting information about the location of faults to an operator.

17. The method of claim 16, further comprising assigning the wired path controller a network identification number.

18. The method of claim 11, wherein the wired path controller includes a signal repeater.

19. The method of claim 11, further comprising providing a third conductive element within the outer pipe.

20. A wired telemetry system, comprising:
an outer pipe, wherein the outer pipe comprises a shoulder disposed on an inner surface;
an inner pipe disposed within the outer pipe, wherein the inner pipe comprises a projection that is axially supported by the shoulder;
a first conductive element coupled to the inner pipe and disposed at least partially within an annulus between the inner pipe and the outer pipe;
a second conductive element disposed within the outer pipe;
a wired path controller disposed in the projection of the inner pipe, wherein the wired path controller is coupled to each of the first conductive element and the second conductive element, and wherein the wired path controller is configured to switch between the first conductive element and the second conductive element in response to a detected fault in one of the first conductive element or the second conductive element; and
a connector disposed in the projection of the inner pipe, wherein the connector couples the second conductive element to the wired path controller.

* * * * *